United States Patent [19]

Eichenberger

[11] Patent Number: 5,429,374
[45] Date of Patent: Jul. 4, 1995

[54] PRESSURE SENSITIVE RESILIENT DYNAMIC SEAL

[75] Inventor: Peter Eichenberger, Farmington Hills, Mich.

[73] Assignee: Ford Motor Company, Dearborn, Mich.

[21] Appl. No.: 985,429

[22] Filed: Dec. 4, 1992

[51] Int. Cl.$^6$ .............................. F16J 15/16
[52] U.S. Cl. ......................... 277/27; 277/29; 277/75; 277/174
[58] Field of Search ............ 277/27, 28, 29, 152, 277/70, 71, 74, 75, 165, 173, 174

[56] References Cited

U.S. PATENT DOCUMENTS

| | | | |
|---|---|---|---|
| 2,242,184 | 5/1941 | Reuter . | |
| 2,830,832 | 4/1958 | Moorman et al. | 277/29 |
| 3,815,926 | 6/1974 | Vore | 277/75 |
| 3,942,805 | 3/1976 | Sundquist | 277/75 |
| 4,256,314 | 3/1981 | Berglund et al. . | |
| 4,337,956 | 7/1982 | Hopper | 277/29 |
| 4,498,353 | 2/1985 | Kitade . | |
| 4,537,210 | 8/1985 | Hiestand | 277/24 |
| 4,593,914 | 6/1986 | Johnson | 277/165 |
| 4,718,820 | 1/1988 | Jaques . | |
| 5,029,685 | 7/1991 | Takase et al. . | |
| 5,075,961 | 12/1991 | St. Hilaire . | |
| 5,297,804 | 7/1994 | Siegrist et al. | 277/174 |

*Primary Examiner*—Daniel G. DePumpo
*Attorney, Agent, or Firm*—Frank G. McKenzie; Roger L. May

[57] ABSTRACT

A dynamic hydraulic seal located in a gland or recess that is selectively pressurized and vented includes outer lips forced by hydraulic pressure into contact with the surfaces of the recess, inner lips forced by hydraulic pressure into sealing contact with a rotating member, and a web extending across the recess and formed with multiple holes through its thickness which serve as a passage for the hydraulic pressure through the seal to an hydraulic passage, which carries hydraulic fluid to journal or bearing surfaces that require lubrication. In the unpressurized free-state, the seal is retracted from contact with the dynamic surface and the web assumes an arcuate shape that closes the hole through its thickness. When pressurized, the seal deforms, the webs flatten, the hole is opened and the inner lips are forced by the hydraulic pressure into contact with the dynamic surface.

4 Claims, 3 Drawing Sheets

PRESSURE SENSITIVE RESILIENT DYNAMIC SEAL

BACKGROUND OF THE INVENTION

1. Field of the Invention

This invention relates to the field of dynamic hydraulic seals, particularly to seals that move into sealing contact due to hydraulic pressure and retract from such contact when pressure is removed.

2. Description of the Prior Art

Many different techniques have been used to produce a dynamic hydraulic seal where reciprocating or rotary motion occurs between parts being sealed. An O-ring is a positive seal that is squeezed at the top and bottom surface of its groove against the mating part. It is capable of sealing very high pressure, which forces the seal against the side of its groove thereby producing a positive seal on three surfaces. O-rings are usually limited to reciprocating parts having relatively short motion, e.g., a valve spool located in a chamber of an hydraulic circuit. A backup ring is often used with an O-ring to prevent its being extruded into the space between the mating parts.

Other dynamic seals include backup rings, lathe-cut O-rings and T-ring seals. A lathe-cut seal is an O-ring having a square cross-section. A T-ring is used in reciprocating dynamic applications to maximize the contact pressure on the sealing surface.

A lip seal is a dynamic seal used principally on rotating shafts to provide a positive seal against relatively low pressure. The lip seal is installed toward the pressure source, which causes deformation of the seal and forces the seal against a contact surface.

In an automatic transmission it is necessary to carry hydraulic fluid from passages formed in the transmission casing to a rotating component, such as a planetary pinion carrier or a rotating shaft. It is conventional practice to locate an O-ring seal on opposite axial side of the passage by arranging a connection such that the pressure of the hydraulic fluid forces the O-rings against the lateral surfaces of their grooves so that a high quality pressure seal results. This arrangement, however, maintains a frictional drag force on a rotating component because the O-rings require an interference fit between the transmission casing and the rotating component. This continual drag force lowers the overall operating efficiency of the transmission by drawing power from the internal combustion engine to overcome the drag losses.

U.S. Pat. No. 4,718,820 describes an annular grease seal for sealing a rotating shaft in the casing of the fluid pump. A grease fitting permits grease to flow around bearings supporting the shaft and to reposition the grease seals adjacent the bearing to an upright position.

SUMMARY OF THE INVENTION

It is an object this invention to increase the efficiency of a mechanical system, such as an automatic transmission, by reducing drag forces inherent in the use of a dynamic pressurized seal. The drag force and the sealing effect of the seal according to this invention is present only when pressurized hydraulic fluid is applied to the seal or a recess containing the seal. Diaphram action of the seal provides for a positive seal between static and dynamic parts when hydraulic fluid is required; otherwise the sealing effect of the seal is removed, thereby eliminating the drag force and reducing wear on the surfaces of the seal.

An advantage of this seal is that it does not require close dimensional tolerances of the seal recess or seal members, instead it permits a high quality reliable seal to be produced at low cost.

This seal is located in a gland or recess formed in a stationary component in which an hydraulic passage is formed. The recess is alternatively pressurized and vented in accordance with the lubricating requirements of the components that communicate through the seal with the hydraulic passage. For example, a rotating shaft or a rotating planetary pinion carrier may be arranged in relation to the transmission casing and gland such that it presents a rotating surface closely spaced from an adjacent surface at the base of the recess. The rotating component is formed with passages that communicate the recess to a needle bearing or journalled surface requiring lubrication.

The seal includes outer lips contacting the lateral surfaces of the recess and inner lips contacting the lateral surfaces of the gland and adapted to be forced into sealing contact on rotating component. When the recess is pressurized, the seal is moved in the recess into contact with the rotating component, the shape of the seal is changed from its unpressurized form such that a hole through the seal is opened due to the deformation of the seal under pressure, thereby opening communication from the pressurized passage through the seal to a passage formed in the rotating component.

DESCRIPTION OF THE PREFERRED EMBODIMENT

Figure 1:
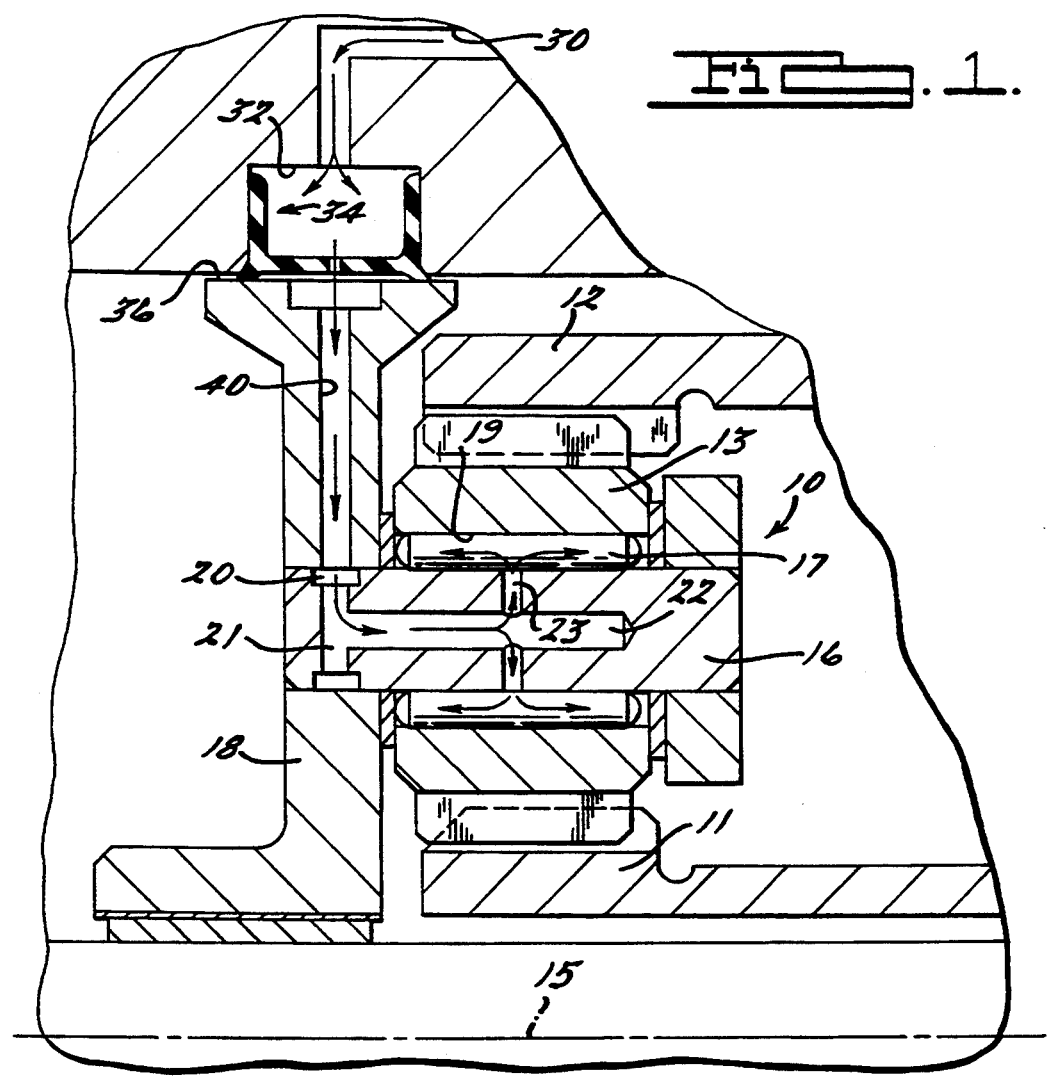
FIG. 1 is a cross section taken at a longitudinal plane through a planetary gearset and transmission casing.

Referring first to FIG. 1, the elements of a planetary gearset 10, typical of the kind used in an automatic transmission, include a sun gear 11, ring gear 12, planetary pinions 13, and pinion carrier 18. The pinions 13 are usually a set of three or four such pinions spaced angularly about the axis 15 in continual meshing engagement with the ring gear and sun gear. Each planet pinion is supported rotatably on a pinion shaft 16 supported in aligned bores formed in the pinion carrier 18.

Each planet pinion is rotatably supported on the pinion shaft by a needle bearing assembly 17 located in the angular space between the diameter of the bore 19 formed through the pinion and outer diameter of the pinion shaft. The gearset including the pinion carrier is suitably supported within the transmission casing for rotation about axis 15.

When the carrier is rotating, the pinion bearings are lubricated using the carrier as an oil slinging instrument, picking up oil from a centrally located oil circuit and bringing oil to the respective bearing locations by centrifugal action. If the carrier is held stationary while the pinions are turning, the aforementioned lubrication is no longer effective. FIG. 1 shows fluid paths that supply lubrication while the pinion carrier is stationary.

Hydraulic fluid for lubricating the bearing assembly 17 is carried through a passage 30 to an angular recess 32. Both the passage and recess are formed in the transmission casing. A seal 34 located within recess 32, seats on the outer surface 36 of the pinion carrier 18.

A radially directed hydraulic passage 40 carries pressurized hydraulic fluid radially inward to an angular recess 20 formed on the outer surface of pinion shaft 16. Recess 20 communicates with a radially directed passage 21 and with an axially directed passage 22. Radially directed holes 23 formed in shaft 16 communicate with passage 22 and carry hydraulic fluid radially outward to the needle bearings 17, thereby lubricating the bearing and the surfaces of shaft 16 and pinions 13.

Figure 2A:
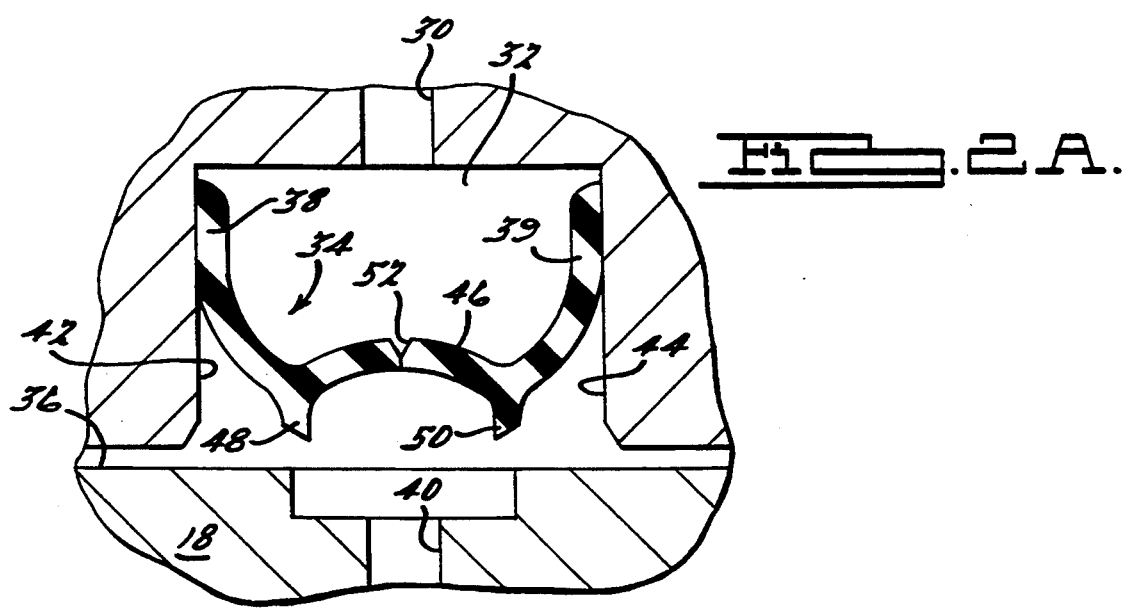
FIGS. 2A and 2B show a form of the seal of this invention in the unpressurized and pressurized states, respectively.
Figure 2B:
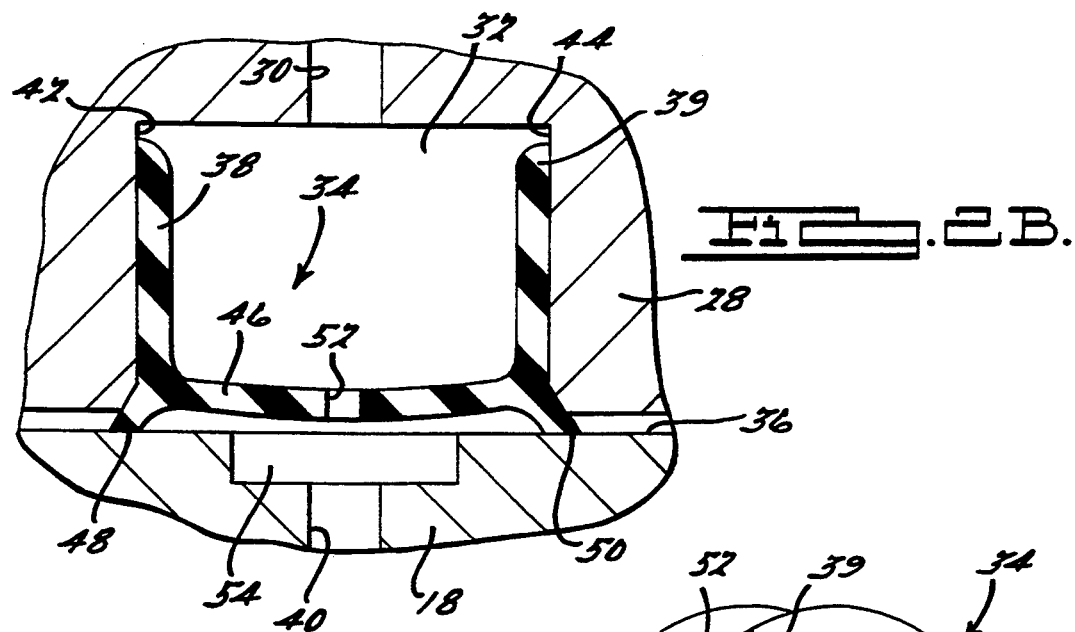

Referring now to FIGS. 2A and 2B, passage 30 is selectively pressurized and vented, and seal 34 changes its form from the unpressurized condition of FIG. 2A to the pressurized state of FIG. 2B. The seal includes first and second legs 38, 39, which contact the axial surfaces 42, 44 of recess 32. A web 46 connects the legs and first and second lips 48, 50, which extend from the web toward surface 36 of the carrier 18. While passage 30 and recess 32 are unpressurized, web 46 is arcuate, its convex side facing the outer surface of the recess, i.e., the pressure source and its concave side face passage 40.

The web includes holes 52 mutually spaced angularly about the axis of the seal and aligned axially with a recess 54 located at the radially outer end of passage 40. FIG. 2A shows that the web holes 52 are pinched and substantially closed against the flow of hydraulic fluid when recess 32 is unpressurized or vented. FIG. 2B shows that the seal is readily displaced such that legs 38 and 39 are held in contact with surfaces 42 and 44. The web is substantially flattened and forced downward to open holes 52, and lips 48, 50 are forced radially inward into forced contact with surface 36. A small clearance is provided between the inner surface of the transmission casing and the outer surface 36 of carrier 18.

Holes 52 remain closed during the brief period after recess 32 is pressurized and before lips 48, 50 become seated on surface 36. This prevents leakage past the seal and along the clearance between the adjacent casing 28 and carrier 18 before the lips become seated on the sealing surface.

Figure 3:
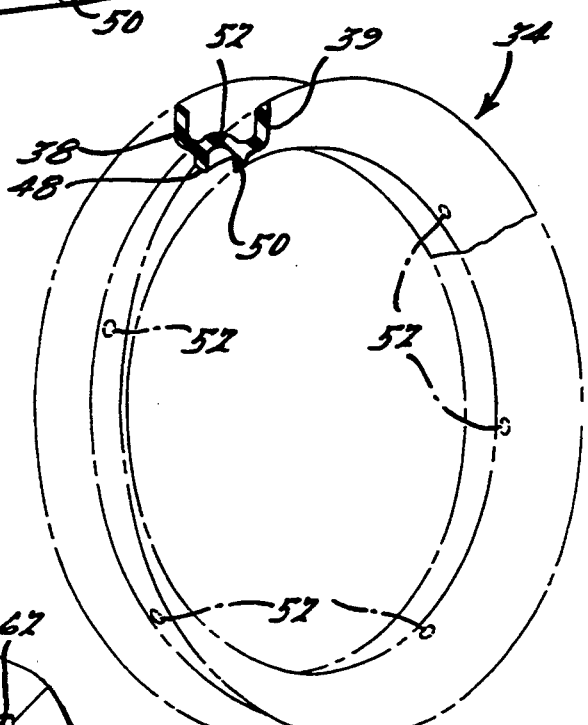
FIG. 3 is a perspective view showing the seal of FIG. 2 in the free state.

FIG. 3 shows the annular seal according to this invention.

Figure 4A:
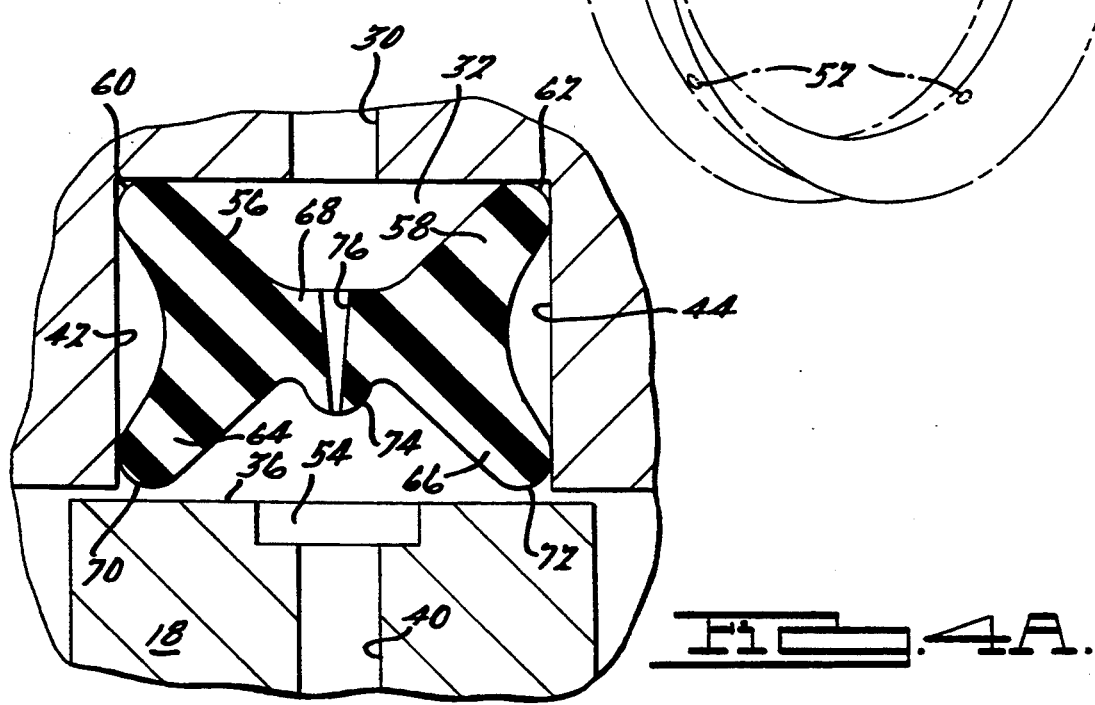
FIGS. 4A and 4B show a form of the seal of this invention in the free state and pressurized state, respectively.

In FIG. 4A, still another form of the seal, which localizes the area of contact between the legs and the axial or lateral surfaces 42, 44 of recess 32, is shown in the unpressurized condition. The seal includes outer legs 56, 58 terminating in outer lips 60, 62 that bear against the surfaces of recess 32. The seal includes inner legs 64, 66 extending radially inward and axially outward from web 68 terminating at radially inner lips 70, 72. A spherical radius 74 supports the web immediately below a hole 76, which extends through the seal from the pressure side to the unpressurized side.

The surfaces of the lips are in line-to-line contact with the surfaces 42, 44 of the recess or have a slight interference (about 0.50 mm) with the lateral surfaces of the recess.

Figure 4B:
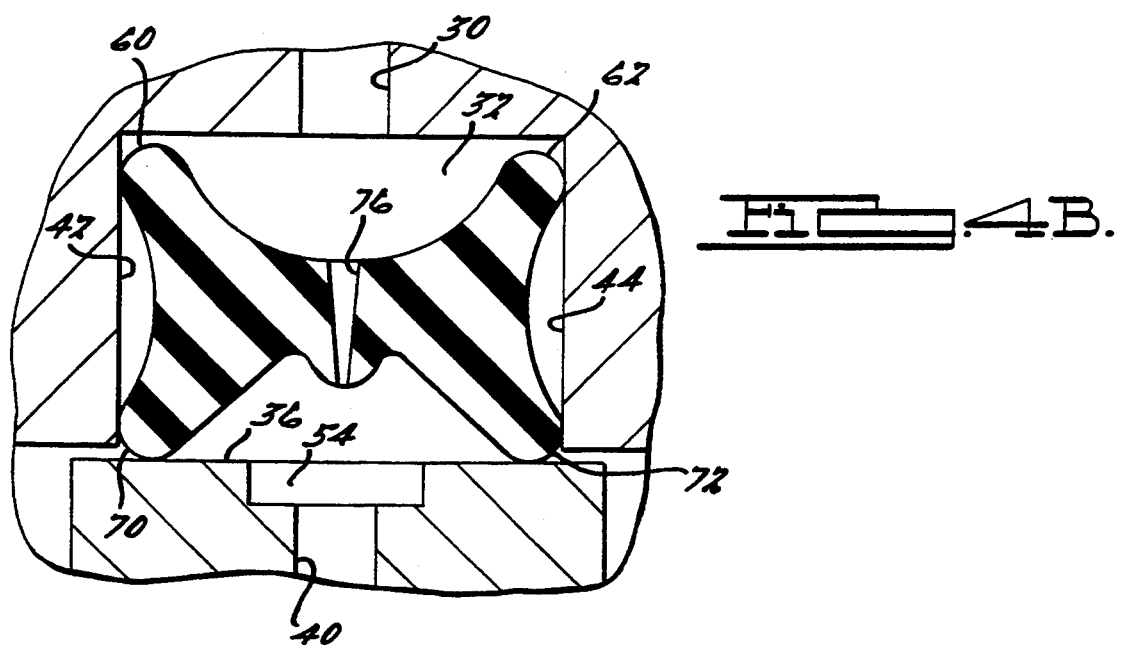

FIG. 4B shows that the seal is displaced by hydraulic pressure radially inward from the unpressurized position of FIG. 4A. The effect of hydraulic pressure distorts slightly the form of the seal, especially the outer surface which attains a circular arcuate form under pressure of about 4-6 psi. The inner lips 70, 72 are forced due to pressure into sealing contact with surface 36 and surfaces 42, 44. Lips 60, 62 are forced into sealing contact with the lateral surfaces of recess 32.

The actuating pressure that moves the seal from the position of FIG. 4A to that of FIG. 4B is 4-6 psi; the operating pressure is 6-10 psi. The operating temperature of the hydraulic fluid is in the range of 250° F. to minus 40° F. The hydraulic fluid is automatic transmission fluid ESP-M2CL66-H.

The seal is polyacrylate elastomer having a durometer of about 70. The ASTM number for the elastomer is D2000 M2D708B16E016E036F15. The size of the hole in the seal is approximately 0.026 inches at the radially outer end and 0.008 inches at the inner end. The overall axial width of the seal is 0.394 inches, its radial thickness is 0.276 inches, the thickness of the web is 0.080 inches and the spherical radius is 0.030 inches. The desired flow rate through the seal is 0.3-1.0 liters per minute. The size of the transmission housing recess 32 is approximately 10 mm×7 mm; the clearance between the carrier and transmission housing is about 1.02 mm; and the planetary carrier diameter is about 6.00 inches (152.40 mm).

It has been discovered that the seal tends to return to its free-state or unpressurized dimensions when the pressure load is removed. Therefore, by maintaining a slight interference fit or a small clearance between the seal and lateral walls of the recess, the seal will lift off surface 36 when pressure is removed. This removal of lips 70, 72 from surface 36 when pressure is removed eliminates drag and wear on the inside surfaces of those lips.

When pressure is applied, the outer seal lips 60, 62 deflect toward the transmission casing and force the inner seal lips to a condition of hard interference seated fit on surface 36.

A small bead, in the form of a spherical radius 74, provides support and mass for the through-hole while the seal is being molded. The bead tends to close the hole, at least partially, when the seal is in the free-state condition of FIG. 4A.

Figure 5A:
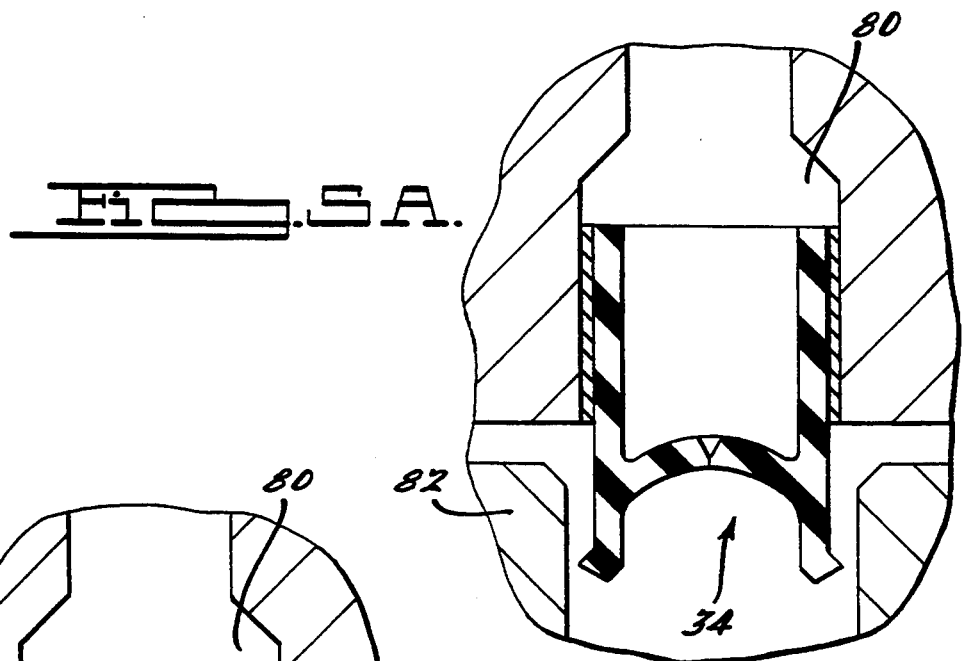
FIG. 5A and 5B show a form of the seal located at the center axis of rotating shafts.
Figure 5B:
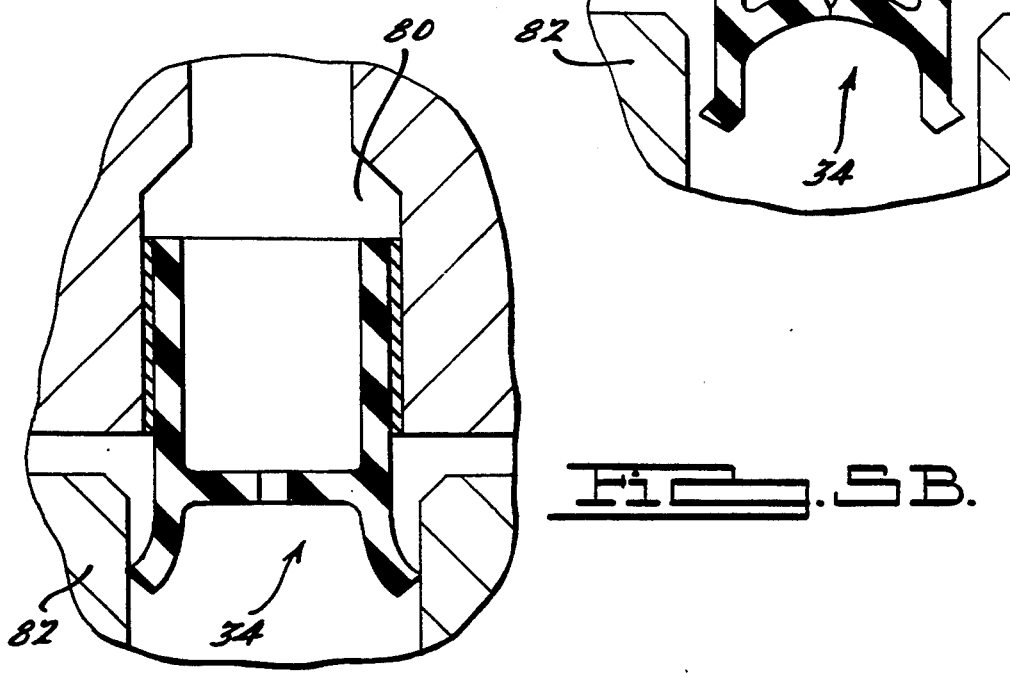

FIGS. 5A and 5B illustrate another frequently encountered transmission sealing requirement wherein clutches and lubrication circuits are supplied with hydraulic fluid through the center of rotating shafts 80, 82. Oil is fed through a conduit in a nonrotating shaft to a rotating shaft 82 or from one rotating shaft to another. Conventionally, this is accomplished with the help of steel tubes having O-rings (if static) and/or dynamic PTFE (Teflon) seals at their respective ends.

The seal according to this invention reduces part count, sensitivity to shaft alignment and dimensional tolerance because of the seal's flexibility in comparison to conventional steel tubing.

I claim:

1. A pressure sensitive seal arrangement, comprising:
 a recess formed in a first component, facing a second component, communicating with a fluid pressure source; and
 a seal located in the recess, having an unpressurized form while the recess is vented and a pressurized form while the recess is pressurized, and the seal translates radially within the recess when the recess is pressurized, the seal including
  a web separating a pressurized side of the seal from a low pressure side of the seal, the web having a first surface, the first surface having a substantially arcuate form while the recess is vented and the first surface being substantially flattened while the recess is pressurized;

lips located on the first surface, retracted from contact with the second component due to the generally arcuate form of the first surface while the recess is substantially vented, and extended into sealing contact with the second component due to the flattening of the first surface while the recess is pressurized; and a hole through the web communicating the pressurized side of the seal and the low pressure side of the seal, the hole being substantially closed due to the generally arcuate form of the first surface while the recess is substantially vented, and the hole being opened due to flattening of the first surface while the recess is pressurized.

2. A pressure sensitive seal comprising:

a first member separating a pressurized side of the seal from a low pressure side of the seal, having a contracted form while the seal is unpressurized and an expanded form while the seal is pressurized, said member supporting lips that move toward a component to be sealed as the seal is pressurized and away from sealing contact as the the seal is vented, having a hole through the first member, said hole being substantially closed due to contraction of the first member while the seal is unpressurized and opened due to expansion of the first member while the seal is pressurized.

3. The seal of claim 2 further comprising;

a second member located at a first lateral side of the first member and a third member located at a second lateral side of the first member opposite the first lateral side of the first member, said first, second and third members defining a space therebetween, the second and third members being forced outward from said space while the recess is pressurized.

4. The seal of claim 2 wherein the seal is annular and surrounds an axis, wherein the first member is annular and the seal further comprises:

the lips are annular and;

the hole comprises multiple holes spaced mutually about the axis, formed through the first member, communicating the pressurized side of the seal and the low pressure side of the seal.

* * * * *